Figure 1:
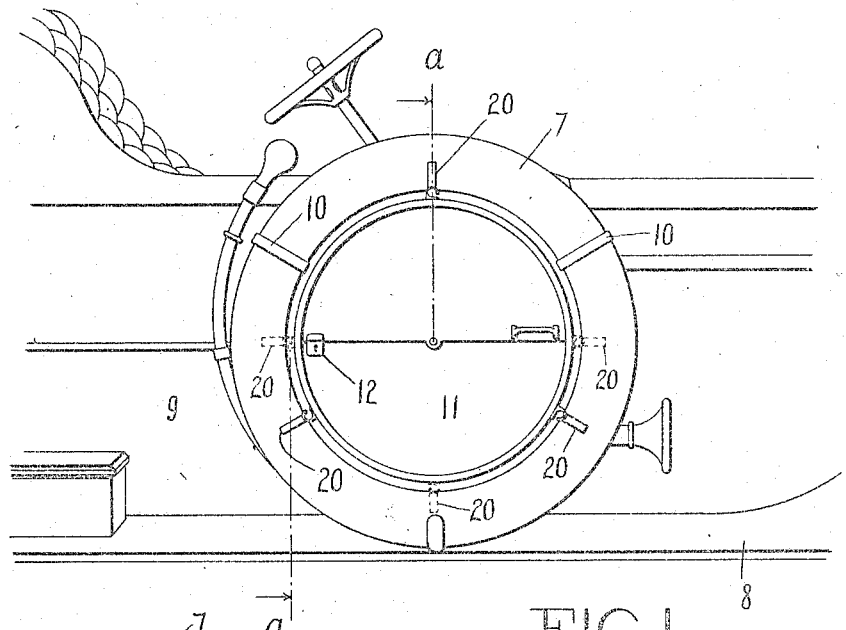

A. ZIEVE.
CLAMPING OR LOCKING DEVICE.
APPLICATION FILED NOV. 17, 1913.

1,135,481.  Patented Apr. 13, 1915.

Witnesses  Inventor
  Abraham Zieve.
By his Attorney

UNITED STATES PATENT OFFICE.

ABRAHAM ZIEVE, OF BATHBEACH, NEW YORK, ASSIGNOR TO THE AUTO TRUNK AND ACME SUIT CASE MFG. CO., INC., OF NEW YORK, N. Y., A CORPORATION.

CLAMPING OR LOCKING DEVICE.

1,135,481.        Specification of Letters Patent.        Patented Apr. 13, 1915.

Application filed November 17, 1913. Serial No. 801,433.

*To all whom it may concern:*

Be it known that I, ABRAHAM ZIEVE, a subject of the Emperor of Russia, residing at Bathbeach, in the county of Kings and State of New York, have invented certain new and useful Improvements in Clamping or Locking Devices, of which the following, taken in connection with the accompanying sheet of drawings, is a full, clear, and exact description.

The present invention relates generally to improvements in clamping or locking devices, and is particularly directed to the provision of means applicable to tire trunks, which are provided to contain inner tubes and tire accessories for motor vehicles, to prevent removal thereof from the vehicles by unauthorized persons.

As is well known, tire trunks are usually mounted on the running board or at the back of the body of the vehicle, being generally positioned within a spare shoe or tire, which is customarily carried and which is held in metal brackets made fast to the contiguous parts of the body of the vehicle. The tire trunk is held in place within the shoe by means of leather straps or bands which are secured to the trunk and are buckled or strapped about the shoe. This method has been found to possess many disadvantages, the foremost being that the tire trunks may be detached from the supporting shoe by the simple expedient of unbuckling the strap or by cutting the strap with a sharp instrument. By this means, tire trunks are frequently stolen or surreptitiously removed from the vehicles to which they are attached, resulting in not only the loss of the trunk but in the loss of the articles therein contained which are often of considerable value.

My invention has for its principal object the provision of means which will prevent the unlawful removal of tire trunks in the manner aforesaid, and which will at the same time afford a strong and positive support for the trunks so that they cannot work loose through the vibration of the vehicle and become lost in transit.

My invention is further directed to a means for locking or clamping a tire trunk to a spare shoe, or to some suitable and convenient part of the vehicle, which will be simple and efficient in operation, and which may be cheaply manufactured as a part of new trunks, and may be readily applied to existing forms of trunks without subjecting the same to any alteration in their general appearance.

My invention further contemplates a means for locking tire trunks to spare shoes which is so constructed that it is adjustable to various sizes of shoes, so that it may be universally used, and which embodies a structure whereby it may only be adjusted or locked or unlocked by a means which will eliminate the possibility of tampering therewith by unauthorized persons, thereby affording absolute protection to the trunk and its contents.

While my invention is particularly adaptable for use in connection with the tire trunks as hereinbefore explained, it is obvious that there are many other avenues of use therefor which will present themselves from time to time, and I would have it understood that I do not desire to limit myself to the specific application or use herein shown and described, I having elected to set forth my invention in connection with a tire trunk to render a clear and comprehensive understanding thereof to those skilled in the art.

I shall now proceed to describe my invention with reference to the accompanying drawings, and then point out more particularly the essential elements of novelty therein in the appended claims.

Figures 2, 3:
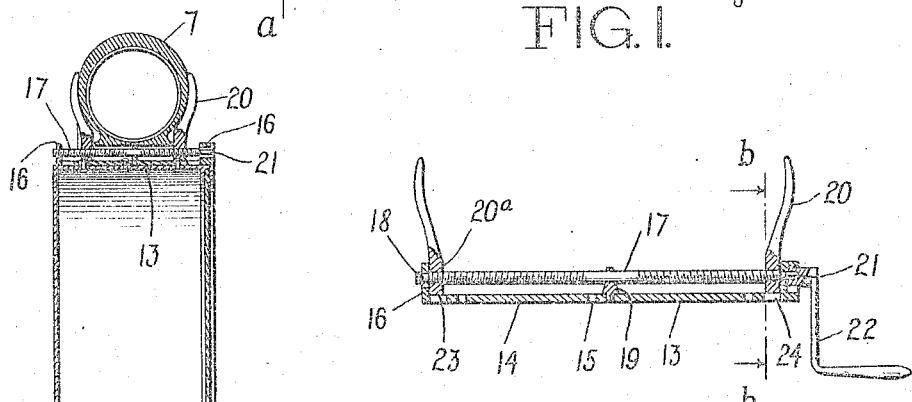
Figure 4:
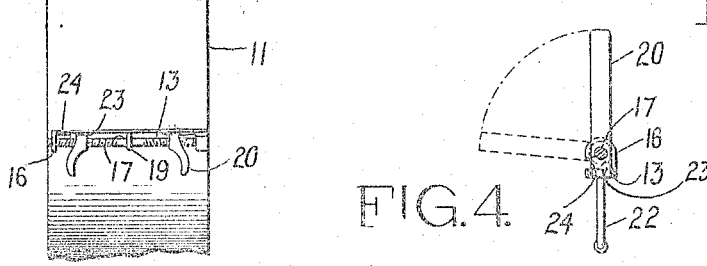

In the drawings: Figure 1 is a side elevation of a motor vehicle body showing the usual spare shoe mounted thereon and a tire trunk positioned therein by means of my adjustable clamping device, Fig. 2 is an elevation partly in section on the line $a$—$a$ of Fig. 1 showing the manner in which my device is positioned on the periphery of the tire trunk, one of the clamping members being shown in engagement with the shoe. Fig. 3 is a side elevation, partly in section, of my adjustable clamping device showing the operating lever or crank, and Fig. 4 is a view on the line $b$—$b$ of Fig. 3, showing in dotted line the position of the clamping members when knocked-down.

Referring now to the drawings in detail, in which like characters of reference are employed to designate similar parts throughout the several views, 7 indicates a spare shoe which in the present illustration is mounted on the running board 8 of the body 9 of the vehicle, the shoe being locked in the usual supports 10.

11 is a tire trunk of the well-known type which is made of a size and configuration to fit within the shoe, as shown, and which is provided with a suitable lock 12 for protecting the contents thereof.

Mounted on the periphery of the trunk 11 and extending transversely thereof are the clamping or locking devices 13. One or more of these clamping devices may be used, but I have found it preferable to employ three which are positioned at approximately equi-distant points on the periphery of the trunk 11 as shown. By the employment of this number of clamps the trunk is firmly supported in position and locked against displacement or removal.

Each clamping device 13 comprises a plate or bracket 14 which is apertured at 15 so that it may be secured to the tire trunk by means of countersunk screws, rivets or the like. The ends of this plate are upset to provide the ears 16 which are apertured, and form bearings for the rotatable screw threaded guide 17 the ends of which are formed with shoulders 18 to facilitate assemblage of the parts, portions of the ears 16 being cut off to permit the shoulder ends of the guide 17 to be operatively positioned therein. The screw threaded guide 17 is provided with right and left hand threads and is centrally supported in a bearing 19 positioned on the plate 14. The shoe engaging or clamping members 20 are made of any suitable metal, preferably brass, or the like, and are of a configuration which will insure a positive grip of the shoe, the shape being one which will preferably follow the contour of the side wall of the shoe as shown. These clamping members 20 at their lower ends are respectively provided with internally right and left hand threaded bores 20ª, the threads of which are adapted to be engaged by the right and left hand threads of the guide member 17 for the purposes which will be hereinafter more fully explained. One end of this guide member 17 is formed with a squared shoulder 21 which is housed within a recess formed by an outwardly directed flange on the contiguous ear 16. This squared shoulder is adapted to be engaged by the operating crank or lever 22 which is provided with an opening so that it may be keyed thereto, by which means the guide 17 is rotated within its bearings and the clamping members 20 caused to move toward and away from each other thereon.

When it is desired to position a tire trunk, provided with my improved clamping device, within a shoe attached to the running board or other part of the vehicle, the guide 17 is rotated by means of the crank 22 until the clamping members 20 reach the limit of their outward movement assuming the positions shown in Fig. 3. As the lower ends 23 of the clamping members 20 are normally in contact with the upper surface of the plate 14 which forms a bearing surface or track therefor, during the movement of the clamping members 20 to and fro on said plate, whereby they are maintained in operative position, it will be observed that, as the clamping members reach the end of their outward movement, they will fall or drop to a position at relatively right angles to their clamping or operative position, as shown in dotted lines in Fig. 4. This is due to the fact that the plate 14 is recessed or cut away at 24, adjacent to each of the ears 16, so that no bearing surface is provided for the lower ends of the clamping members at this point and they consequently pivot on the guide 17 when they reach this position.

It will be manifest that when the clamping members 20 are in a collapsed position, there will be no difficulty in positioning the trunk 11 relatively to the shoe 7, after which the clamping members 20 may be manually moved or thrown into position to be operated or adjusted by means of the crank actuated screw 17 so that they will approach each other and firmly and positively grip the side walls of the shoe, the manner in which they are thus positioned being clearly shown in Fig. 2. When the trunk has been thus locked into place the operating crank is simply withdrawn from engagement with the shoulder of the screw guide 17, and the shoulder being countersunk within the housing formed by the extending flange of the ear 16 makes it practically impossible for any unauthorized person to obtain access thereto, unless he is provided with an operating lever or similar key.

I have described my invention with particular reference to the details of structure herein illustrated, but it is apparent that the same may be varied in different ways without departing from the spirit and scope of my invention.

Having thus described my invention what I claim as new herein and desire to secure by Letters Patent is:

1. A clamping device, comprising a rotatable member, clamping members mounted thereon and arranged to swivel on said member on reaching their outer limits of movement and means independent of said rotatable member to rotate the same and actuate said clamping members.

2. In combination with a tire trunk and a spare shoe, said trunk being positioned within said shoe, a clamping device mounted on said trunk, said clamping device comprising a rotatable member, clamping members mounted thereon and means for rotating said rotatable member to actuate said clamping members to engage with and grip the wall of said shoe, said clamping members being adapted to swivel on said rotatable member on reaching a predetermined limit of movement.

3. The combination with a tire trunk adapted to be positioned within a spare shoe on a motor vehicle, of means for locking said trunk to said shoe, said means comprising a rotatable guide member, clamping members oppositely positioned thereon, and means for rotating said guide member to actuate said clamping members thereon, the rotation of the guide member in one direction causing said clamping members to approach each other and grip the side walls of said shoe, and in the opposite direction to recede from each other, to permit the removal of the trunk from its position within the shoe, said clamping members being adapted to swivel on said rotatable member on reaching their outer limits of movement.

4. The combination with a motor vehicle of a spare shoe carried thereby, a tire trunk positioned within said shoe, and means for locking said trunk to said shoe; said means comprising a rotatable member, a pair of clamping members mounted thereon and removable means for operating said rotatable member, the movement of said operating means in one direction causing said clamping members to approach each other and grip the wall of said shoe to firmly lock said trunk thereto, and in the reverse direction to cause said clamping members to recede from each other and out of contact with said shoe to permit the removal of the trunk from its position within said shoe, said clamping members being adapted to swivel on said rotatable member on reaching their outer limits of movement.

5. A locking device comprising a plate having upturned ears at each of its opposite ends, said ears being apertured to provide bearing surfaces, a right and left threaded guide member rotatably mounted within said bearings, clamping members oppositely positioned on said guide member and threaded for actuation thereby, means detachable from said guide member for rotating the same and actuating said clamping members, and means for maintaining said clamping members in clamping position during the actuation thereof, said means becoming ineffective when the clamping members reach the limit of their outward movement, to permit said clamping members to swivel on said guide member.

6. A clamping device comprising a rotatable member, clamping members mounted thereon and arranged to swivel on said member on reaching a predetermined limit of movement, means for rotating said rotatable member to actuate said clamping members, and means for guiding the movement of said clamping members during the actuation thereof.

7. A clamping device comprising a rotatable member, clamping members mounted thereon, means for rotating said rotatable member to actuate said clamping members, and means for guiding the movement of said clamping members during the actuation thereof, said means becoming ineffective when said clamping members reach a predetermined zone relative to said rotatable member.

8. A clamping device comprising a rotatable member, clamping members mounted thereon, means for rotating said rotatable member to actuate said clamping members, and means for guiding the movement of said clamping members during the actuation thereof, said means becoming ineffective when said clamping members reach a predetermined limit of movement, to permit said clamping members to swivel on said rotatable member.

In witness whereof I have hereunto set my hand in the presence of two subscribing witnesses this 14th day of November, 1913.

ABRAHAM ZIEVE.

Witnesses:
WM. C. DURNN,
P. FRANK SONNEK.